(12) United States Patent
Qi et al.

(10) Patent No.: US 9,266,764 B2
(45) Date of Patent: *Feb. 23, 2016

(54) HOLLOW MICROSPHERES AND METHOD OF MAKING HOLLOW MICROSPHERES

(75) Inventors: Gang Qi, Stillwater, MN (US); Satinder K. Nayar, Woodbury, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 236 days.

This patent is subject to a terminal disclaimer.

(21) Appl. No.: 13/996,182

(22) PCT Filed: Dec. 13, 2011

(86) PCT No.: PCT/US2011/064581
§ 371 (c)(1),
(2), (4) Date: Jun. 20, 2013

(87) PCT Pub. No.: WO2012/087656
PCT Pub. Date: Jun. 28, 2012

(65) Prior Publication Data
US 2013/0291590 A1    Nov. 7, 2013

Related U.S. Application Data

(60) Provisional application No. 61/424,960, filed on Dec. 20, 2010.

(51) Int. Cl.
C03B 19/10    (2006.01)
C03C 11/00    (2006.01)

(52) U.S. Cl.
CPC ............. *C03B 19/107* (2013.01); *C03C 11/002* (2013.01)

(58) Field of Classification Search
USPC .................................................. 65/21.4, 142
IPC ................................ C03B 19/10; C03C 11/002
See application file for complete search history.

(56) References Cited

U.S. PATENT DOCUMENTS

| | | | |
|---|---|---|---|
| 2,838,881 A | 6/1958 | Plumat | |
| 2,978,340 A | 4/1961 | Veatch et al. | |
| 3,030,215 A | 4/1962 | Veatch et al. | |
| 3,129,086 A | 4/1964 | Veatch et al. | |
| 3,230,064 A | 1/1966 | Veatch et al. | |
| 3,365,315 A | 1/1968 | Beck et al. | |
| 3,838,998 A | 10/1974 | Matthews et al. | |
| 4,133,854 A * | 1/1979 | Hendricks | 264/10 |
| 4,163,637 A | 8/1979 | Hendricks et al. | |
| 4,257,798 A | 3/1981 | Hendricks et al. | |
| 4,391,646 A | 7/1983 | Howell et al. | |
| 4,661,137 A * | 4/1987 | Garnier et al. | 65/21.4 |
| 4,767,726 A | 8/1988 | Marshall | |
| 4,935,387 A * | 6/1990 | Beall et al. | 501/3 |
| 5,849,055 A | 12/1998 | Arai et al. | |
| 8,261,577 B2 * | 9/2012 | Qi | 65/21.1 |
| 2001/0043996 A1 | 11/2001 | Yamada et al. | |
| 2006/0122049 A1 | 6/2006 | Marshall et al. | |
| 2011/0152056 A1 * | 6/2011 | Qi | 501/39 |
| 2011/0152057 A1 * | 6/2011 | Qi | 501/39 |
| 2013/0344337 A1 * | 12/2013 | Qi et al. | 428/402 |

FOREIGN PATENT DOCUMENTS

| | | |
|---|---|---|
| EP | 0091555 A1 | 10/1983 |
| JP | 2002037636 A | 2/2002 |
| WO | WO 2006/062566 A1 | 6/2006 |
| WO | WO 2007/050062 A1 | 5/2007 |

OTHER PUBLICATIONS

Budov, V. V., "Hollow Glass Microspheres, Use, Properties, and Technology (Review)", Glass and Ceramics, Springer, New York, NY, vol. 51, No. 7/8, Jul. 1, 1994, pp. 230-235.

Sodeyama, K. et al., "Preparation of fine expanded Perlite", Journal of Materials Science, Kluwer Academic Publishers, Bo., vol. 34, No. 10, May 1, 1999, pp. 2461-2468.

* cited by examiner

*Primary Examiner* — Mark Halpern
(74) *Attorney, Agent, or Firm* — C. Michael Geise

(57) ABSTRACT

There is provided a method for making hollow microspheres by means of dispensing the feed using vibratory energy, preferably ultrasonic energy, hollow microspheres made using the method, and an apparatus for making hollow microspheres.

10 Claims, 2 Drawing Sheets

HOLLOW MICROSPHERES AND METHOD OF MAKING HOLLOW MICROSPHERES

This application is a 371 of PCT/US11/64581 filed 13 Dec. 2011

The present disclosure relates to a method for making hollow microspheres. In particular, the present disclosure also relates to a dispensing method useful for making hollow microspheres.

SUMMARY

In one aspect, the present disclosure provides a method of forming hollow microspheres comprising dispensing a feed under heating conditions sufficient to convert at least a portion of the feed into hollow microspheres, wherein the dispensing is conducted using vibratory energy. In one aspect, the vibratory energy is ultrasonic energy.

In another aspect, the present disclosure provides a method of forming hollow microspheres comprising dispensing a feed under heating conditions sufficient to convert at least a portion of the feed into hollow microspheres, wherein the dispensing is conducted using ultrasonic energy, wherein the feed comprises: (a) between 50 wt % and 90 wt % of SiO2; (b) between 2 wt % and 20 wt % of alkali metal oxides; (c) between 1 wt % and 30 wt % of B2O3; (d) between 0 wt % to 0.5 wt % of sulfur; (e) between 0 wt % and 25 wt % divalent metal oxides; (f) between 0 wt % and 10 wt % of tetravalent metal oxides other than SiO2; (g) between 0 wt % and 20 wt % of trivalent metal oxides; (h) between 0 wt % and 10 wt % of oxides of pentavalent atoms; and (i) between 0 wt % and 5 wt % fluorine.

In still another aspect, the present disclosure provides hollow microspheres made using a method comprising dispensing a feed using ultrasonic energy under heating conditions sufficient to convert at least a portion of the feed into hollow microspheres.

In yet another aspect, the present disclosure also provides an apparatus for forming hollow glass microspheres comprising: a dispensing system having a housing and an ultrasonic device; and a heating system; wherein the heating conditions are sufficient to convert at least a portion of the feed into hollow microspheres, and the dispensing is conducted using ultrasonic energy.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
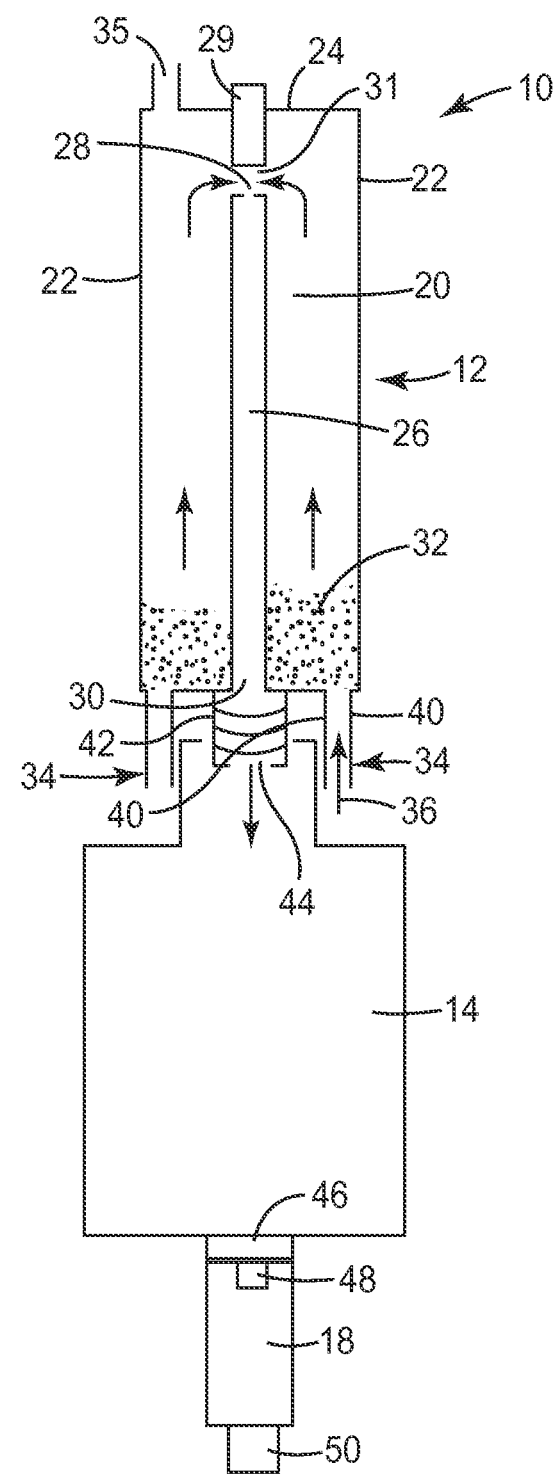
FIG. 1 is a front cross sectional view of one embodiment of the presently disclosed apparatus used to make hollow microspheres.

The term "glass" as used herein includes all amorphous solids or melts that can be used to form amorphous solids, where the raw materials used to form such glass includes various oxides and minerals. These oxides include metal oxides.

The term "recycled glass" as used herein means any materials formed using glass as the raw material.

The term "vacuum" as used herein means absolute pressure below 101,592 Pa (30 in Hg at 0° C.).

The term "ultrasonic energy" as used herein means cyclic sound pressure with a frequency between about 20 KHz and about 200 MHz.

The term "ultrasonic horn" or "sonotrode" as used herein means a device used to pass ultrasonic energy into a liquid medium.

The term "glass frit" as used herein means a suitable glassy material, typically a relatively low melting silicate glass. Silicate glass compositions suitable for forming frit are described, for example, in U.S. Pat. No. 2,978,340 (Veatch et al.); U.S. Pat. No. 3,030,215 (Veatch et al.); U.S. Pat. No. 3,129,086 (Veatch et al.); and U.S. Pat. No. 3,230,064 (Veatch et al.); U.S. Pat. No. 3,365,315 (Beck et al.); and U.S. Pat. No. 4,391,646 (Howell), the disclosures of which are incorporated herein by reference in their entirety.

The term "glass feed" or "feed" as used herein means milled, and optionally classified, glass frit used to produce hollow microspheres.

Hollow microspheres, having a mean diameter of less than about 500 micrometers, have wide utility for many purposes, several of which require certain size, shape, density and strength characteristics. For example, hollow microspheres are widely used in industry as additives to polymeric compounds where they may serve as modifiers, enhancers, rigidifiers, and/or fillers. Generally, it is desirable that the hollow microspheres be strong to avoid being crushed or broken during further processing of the polymeric compound, such as by high pressure spraying, kneading, extrusion or injection molding. It is desirable to provide a method for making hollow microspheres that allows for control over the size, shape, density and strength of the resulting hollow microspheres.

Hollow microspheres and methods for making them have been disclosed in various references. For example, some of these references disclose a process of making hollow microspheres using simultaneous fusion of glass-forming components and expansion of the fused mass. Other references disclose heating a glass composition containing an inorganic gas forming agent, or blowing agent, and heating the glass to a temperature sufficient to liberate the blowing agent. Still other references disclose a process including pulverizing a material by wet pulverization to obtain a slurry of a pulverized powder material, spraying the slurry to form liquid droplets, and heating the liquid droplets to fuse or sinter the powder material in order to obtain inorganic microspheres. Yet other references disclose a process for making low density microspheres by processing precisely formulated feed mixtures in an entrained flow reactor under partially oxidizing conditions with a carefully controlled time-temperature history. However, none of these references provide a method for making hollow microspheres that provides control over the size, shape, density and strength of the hollow microspheres made therefrom.

Hollow microspheres are typically made by heating milled frit, commonly referred to as "feed" that contains a blowing agent. Known methods for making hollow microspheres includes glass melting, glass feed milling, and hollow microsphere formation using a flame. The key to this process is that the glass composition used to form the hollow microsphere must include a certain amount of a blowing agent prior to formation of the hollow microsphere using a flame. The blowing agent is generally a composition that decomposes at high temperatures. Exemplary blowing agents include sulfur or compounds of sulfur and oxygen, which may be present in the glass composition in an amount greater than about 0.12 wt % blowing agent based on the total weight of the glass composition.

In these methods, it is necessary to melt the glass twice, once during batch melting to dissolve the blowing agent in the glass and another time during formation of the hollow microsphere. Because of the volatility of the blowing agent in the glass composition, the batch melting step is limited to relatively low temperatures during which the batch composition becomes very corrosive to the refractory of melting tanks used for the batch melting step. The batch melting step also requires a relatively long time and the sizes of the glass particles used in the batch melting step must be kept small. These issues result in increased cost to and potential impurities in the resulting hollow microspheres. It is desirable to provide a method for making hollow microspheres that are essentially free of a blowing agent.

Feed useful in the present disclosure may be prepared, for example, by crushing and/or milling any suitable glass. The feed, in the present disclosure may have any composition that is capable of forming a glass, such as recycled glass, perlite, silicate glass, and the like. In some embodiments, on a total weight basis, the feed comprises from 50 to 90 percent of $SiO_2$, from 2 to 20 percent of alkali metal oxide, from 1 to 30 percent of $B_2O_3$, from 0 to 0.5 percent of sulfur (for example, as elemental sulfur), from 0 to 25 percent divalent metal oxides (for example, CaO, MgO, BaO, SrO, ZnO, or PbO), from 0 to 10 percent of tetravalent metal oxides other than $SiO_2$ (for example, $TiO_2$, $MnO_2$, or $ZrO_2$), from 0 to 20 percent of trivalent metal oxides (for example, $Al_2O_3$, $Fe_2O_3$, or $Sb_2O_3$, from 0 to 10 percent of oxides of pentavalent atoms (for example, $P_2O_5$ or $V_2O_5$), and from 0 to 5 percent fluorine (as fluoride) which may act as a fluxing agent to facilitate melting of the glass composition. In one embodiment, the feed comprises 485 g of $SiO_2$ (obtained from US Silica, West Virginia, USA), 114 g of $Na_2O.2B_2O_3$, 90% smaller than 590 µm, 161 g of $CaCO_3$, 90% smaller than 44 µm, 29 g of $Na_2CO_3$, 3.49 g of $Na_2SO_4$, 60% smaller than 74 µm, and 10 g of $Na_4P_2O_7$, 90% smaller than 840 µm. In another embodiment the feed comprises 68.02% of $SiO_2$, 7.44% of $Na_2O$, 11.09% $B_2O_3$, 12.7% of $CaCO_3$ and 0.76% of $P_2O_5$.

Additional ingredients are useful in feed compositions and can be included in the feed, for example, to contribute particular properties or characteristics (for example, hardness or color) to the resultant hollow microspheres. The above mentioned feed compositions are essentially free of blowing agent. The phrase "essentially free of blowing agent" as used herein means less than 0.05 wt % (based on the total weight of the feed composition) or 0.12 wt % based on the total weight of the glass of a blowing agent added to the feed composition.

The feed is typically milled, and optionally classified, to produce feed of suitable particle size for forming hollow microspheres of the desired size. Methods that are suitable for milling the feed include, for example, milling using a bead or ball mill, attritor mill, roll mill, disc mill, jet mill, or combination thereof. For example, to prepare feed of suitable particle size for forming hollow microspheres, the feed may be coarsely milled (for example, crushed) using a disc mill, and subsequently finely milled using a jet mill. Jet mills are generally of three types: spiral jet mills, fluidized-bed jet mills, and opposed jet mills, although other types may also be used.

Spiral jet mills include, for example, those available under the trade designations "MICRONIZER JET MILL" from Sturtevant, Inc., Hanover, Mass.; "MICRON-MASTER JET PULVERIZER" from The Jet Pulverizer Co., Moorestown, N.J.; and "MICRO-JET" from Fluid Energy Processing and Equipment Co., Plumsteadville, Pa. In a spiral jet mill a flat cylindrical grinding chamber is surrounded by a nozzle ring. The material to be ground is introduced as particles inside the nozzle ring by an injector. The jets of compressed fluid expand through the nozzles and accelerate the particles, causing size reduction by mutual impact.

Fluidized-bed jet mills are available, for example, under the trade designations "CGS FLUIDIZED BED JET MILL" from Netzsch Inc., Exton, Pa.; "ROTO-JET" from Fluid Energy Processing and Equipment Co.; and "ALPINE MODEL 100 APG" from Hosokawa Micron Powder Systems, Summit, N.J. The lower section of this type of machines is the grinding zone. A ring of grinding nozzles within the grinding zone is focused toward a central point, and the grinding fluid accelerates particles of the material being milled. Size reduction takes place within the fluidized bed of material, and this technique can greatly improve energy efficiency.

Opposed jet mills are similar to fluidized-bed jet mills, except at least two opposed nozzles accelerate particles, causing them to collide at a central point. Opposed jet mills may be commercially obtained, for example, from CCE Technologies, Cottage Grove, Minn.

In some instances, the feed forms agglomerates due to insufficient dispersion of particles, resulting in misshapen hollow microspheres and/or agglomerates. Formation of agglomerates is undesirable since the microspheres formed thereon are typically multicellular structures with increased density. In some instances, the agglomerates don't melt during the heating step due to the fact that the agglomerates are much larger than individual particles. Therefore, there is a need for a method of making hollow glass microspheres while minimizing the formation of agglomerates. Hollow microspheres made using the presently disclosed method have substantially single cell structures. The term "substantially" as used herein means that the majority of the hollow microspheres made using the presently disclosed method have single cell structures. The term "single cell structure" as used herein means that each hollow microsphere is defined by only one outer wall with no additional exterior walls, partial spheres, concentric spheres, or the like present in each individual hollow microsphere. Exemplary single cell structures are shown in the optical images shown in FIG. 2. There is also a need for a method of making hollow glass microspheres comprising the step of dispersing the feed using vibratory energy.

The presently disclosed apparatus includes a dispensing system, a heating system, and a collector. Dispensing of the feed is conducted using vibratory energy. In some embodiments, vibratory energy is provided by a shaker. In some embodiments, the vibratory energy is ultrasonic energy. Wherein the vibratory energy is ultrasonic energy, the dispensing system further comprises an ultrasonic device to allow the feed to be dispensed into the heating system using ultrasonic energy. In some embodiments, the ultrasonic device is an ultrasonic horn connected to a booster which is connected to a piezoelectric transducer. The transducer is energized by a power supply. For the purpose of the present disclosure, the ultrasonic horn, booster, and piezoelectric transducer will be hereinafter collectively referred to as "ultrasonic stack". In some embodiments, the heating system comprises a gas/air flame. In some embodiments, the heating system further comprises a vacuum system. Referring now to FIG. 1, there is shown one exemplary embodiment of the disclosed apparatus 10.

Apparatus 10 shown in FIG. 1 includes a dispensing system 12 comprising an elongated housing 20. Elongated housing 20 has vertical walls 22 that are longer than horizontal walls 24. The size and shape of elongated housing 20 is selected depending on the type and volume of feed to be dispensed there through. For example, elongated housing 20 may be spherically shaped. Exemplary elongated housing 20 shown in FIG. 1 is spherical and has a diameter of about 5.08 cm. Elongated housing 20 may be made of any material suitable for dispensing feed 32, for example materials such as metal, glass, resins, and the like, and combinations thereof.

Elongated housing 20 also includes a hollow inner tube 26 that is vertically centered within elongated housing 20. The size and shape of hollow inner tube 26 is selected depending on the type and volume of feed 32 to be dispensed there through. For example, hollow inner tube 26 may be spherically shaped. Exemplary hollow inner tube 26 shown in FIG. 1 is spherical and has a diameter of about 2.54 cm. Hollow inner tube 26 is open at a top end 28 and a bottom end 30, such that particles or feed 32 may pass there through. Hollow inner tube 26 may be made of any material suitable for dispensing feed 32, for example materials such as metal, glass, resins, and the like, and combinations thereof. For example, hollow inner tube 26 shown in FIG. 1 is constructed entirely of metal.

Elongated housing 20 also includes a neck 34. Neck 34 defines an inlet for receiving a feed 32 and/or carrier gas used to fluidize and move feed 32 into the hollow inner tube in apparatus 10. Neck 34 may be positioned near horizontal wall 24 of dispensing system 12. Alternatively, neck 34 may be positioned near the bottom of vertical wall 22 of dispensing system 12. Exemplary neck 34 shown in FIG. 1 is positioned along a portion of horizontal wall 24 and includes an opening 36 and vertically extending walls 40. Dispensing system 12 shown in FIG. 1 has two necks 34 or may have more along a portion of the bottom horizontal wall 24. Exemplary necks 34 shown in FIG. 1 are small like orifices. An inlet 35 for receiving feed 32 may be located in the top horizontal wall 24 of elongated housing 20, as shown in FIG. 1.

Bottom end 30 of hollow inner tube 26 is operably attached to an inlet 44 to heating system 14. Apparatus 10 may include a transition 42 between bottom end 30 of hollow inner tube 26 and inlet 44 to heating system 14. It is desirable for transition 42 between bottom end 30 of hollow inner tube 26 and inlet 44 to heating system 14 to be sealed to avoid the introduction of ambient air into apparatus 10. For example, transition 42 between bottom end 30 of hollow inner tube 26 and inlet 44 to heating system 14 may be sealed with an o-ring or any other type of conventional gasket material to prevent ambient air from entering apparatus during operation.

Apparatus 10 includes a heating system 14. In some embodiments, heating system 14 comprises a gas/air or gas/air/oxygen flame. The flame may be neutral, reducing or oxidizing, with the gas/air and/or gas/air/oxygen ratio being adjusted to yield hollow microspheres of varying densities and strengths. Any commercially available heating systems may be used, such as for example, a furnace model "Astro 1100-4080 MI" commercially available from Thermal Technology Inc., California, USA. One skilled in the art can appreciate that the temperature within heating system 14 depends on various factors, such as, for example, the type of material used in feed 32. In the presently disclosed method, the temperature within the heating system 14 should be maintained at a temperature greater than or equal to the glass softening temperature. In one embodiment, the temperature within heating system 14 is maintained at a temperature of greater than about 1300° C. Exemplary temperatures include temperatures above about 1300° C., temperatures above about 1410° C., temperatures above about 1550° C., temperatures above about 1560° C., temperatures above about 1575° C., temperatures above about 1600° C., and temperatures above about 1650° C.

Apparatus 10 may also include a vacuum system 16 (not shown) that provides a vacuum within heating system 14. Any commercially available vacuum systems may be used. Vacuum system 16 may be a stand alone system that is connected to heating system 14 via plumbing lines, such as air lines, liquid lines, and the like. Vacuum system 16 may also be integrated into heating system 14, collector 18, or both. For example, cool air blowers commercially available under the trade designation "Master Heat Gun" from Master Appliances Corp. Wisconsin, USA, may be incorporated directly into heating system 14. These cool air blowers may provide cooling air at the inlet to heating system 14, outlet to heating system 14, inlet to collector 18, or a combination thereof. In some embodiments, it is desirable to maintain an internal pressure in the presently disclosed heating system 14 of about less than 6,773 Pa (2 in Hg) absolute. Among other benefits, maintaining an internal pressure in heating system 14 of about less than 6,773 Pa (2 in Hg) absolute is useful in the presently disclosed method of making hollow microspheres when using feed 32 that are essentially free of blowing agent.

Apparatus 10 may also include a collector 18 in which formed hollow microspheres are collected. An inlet 48 of collector 18 is operably attached to outlet 46 of heating system 14. It is desirable for the connection between collector 18 and heating system 14 to be sealed to avoid the introduction of ambient air into apparatus 10. For example, the connection between collector 18 and heating system 14 may be sealed with an o-ring or any other type of conventional gasket material to prevent ambient air from entering apparatus during operation. One skilled in the art can appreciate that collector 18 can be designed numerous ways depending on various factors, such as the size, shape and volume of hollow microspheres being collected therein, integration of vacuum system in heating system 14 therein, operation temperature for apparatus 10, and the like.

As shown in FIG. 1, dispenser 12 of apparatus 10 also includes a moveable ultrasonic horn 29 that extends from the top of elongated housing 20 to just above top end 28 of hollow inner tube 26 in order to provide a gap 31 between moveable ultrasonic horn 29 and top end 28 of hollow inner tube 26. The ultrasonic horn 29 is connected to a booster (not shown). The booster is further connected to a piezoelectric transducer (not shown). The gap 31 may be adjusted by moving ultrasonic horn 29 with respect to top end 28 of the hollow inner tube 26. Any commercially available ultrasonic horn or ultrasonic stack may be used, such as, for example a cylindrical aluminum ultrasonic horn with a 1.2 in (3 cm) diameter having 1:1 gain and 1.5 gain booster (commercially available from Dukane Corporation, St. Charles, Ill.). Other devices can be used alternatively or in addition to the ultrasonic stack to provide vibratory energy, such as, for example, a shaker. While the horn 29 is depicted in FIG. 1 as being a cylindrical rod, other shapes are available. For example, the horn 29 can be a rectangular- or square-shaped (in cross-section) bar, spherical, tapered, double tapered, etc.

Still referring to FIG. 1, during the presently disclosed method for making hollow microspheres, particles or feed 32 are fed into apparatus 10 using a carrier gas, where the carrier gas can be any inert gas. One skilled in the art can appreciate that the flow rate of carrier gas is selected based on various factors, such as, for example, the size, shape and volume of feed being fed into apparatus 10, the desired pressure within apparatus 10, and the like. The flow rate of carrier gas should be sufficient to fluidize feed 32 and introduce feed 32 into an opening at top end 28 of hollow inner tube 26. In some embodiments, feed 32 are pulled toward heating system 14 due to the force of gravity. In some embodiments, feed 32 are pulled toward heating system 14 because of the vacuum created within heating system 14 by vacuum system 16. Once in heating system 14, feed 32 become hollow microspheres. In one embodiment, the hollow microspheres are allowed to free fall via gravity through heating system 14 and exit outlet 46 in heating system 14. In another embodiment, the hollow microspheres may be pulled through outlet 46 in heating system 14 and into collector 18 via a higher vacuum in collector 18 than the vacuum maintained in heating system 14. Hollow microspheres collected in collector 18 may be dispensed from apparatus 10 through outlet 50 in collector 18. Alternately, collector 18 may be removable from apparatus 10 in order to discharge formed hollow microspheres from apparatus 10.

The presently disclosed method yields relatively high throughputs. Throughputs will vary according to the size of the furnace, being higher in larger furnaces. In some embodiments, for a furnace having a hot zone diameter of 2.5 in (6.35 cm), a throughput of more than about 2.1 g/min is used. In some embodiments, the presently disclosed method yield throughput of more than 5.0 g/min, or 7.0 g/min.

Hollow microspheres made using the presently disclosed method have relatively low densities. In some embodiments, the presently disclosed hollow microspheres have a density of less than about 1.5 g/ml. In some embodiments, the presently disclosed hollow microspheres have a density of less than about 0.8 g/ml. In still other embodiments, the presently disclosed hollow microspheres have a density of less than about 0.6 g/ml, or less than about 0.55 g/ml.

The hollow microspheres according to present disclosure may be used in a wide variety of applications, for example, in filler applications, modifier applications, containment applications or substrate applications. Synthetic microspheres according to the preferred embodiments may be used as fillers in composite materials, where they impart properties of cost reduction, weight reduction, improved processing, performance enhancement, improved machinability and/or improved workability. More specifically, the synthetic microspheres may be used as fillers in polymers (including thermoset, thermoplastic, and inorganic geopolymers), inorganic cementitious materials (including material comprising Portland cement, lime cement, alumina-based cements, plaster, phosphate-based cements, magnesia-based cements and other hydraulically settable binders), concrete systems (including precise concrete structures, tilt up concrete panels, columns, suspended concrete structures etc.), putties (e.g. for void filling and patching applications), wood composites (including particleboards, fibreboards, wood/polymer composites and other composite wood structures), clays, and ceramics. One particularly preferred use is in fiber cement building products.

The hollow microspheres may also be used as modifiers in combination with other materials. By appropriate selection of size and geometry, the microspheres may be combined with certain materials to provide unique characteristics, such as increased film thickness, improved distribution, improved flowability etc. Typical modifier applications include light reflecting applications (e.g. highway markers and signs), industrial explosives, blast energy absorbing structures (e.g. for absorbing the energy of bombs and explosives), paints and powder coating applications, grinding and blasting applications, earth drilling applications (e.g. cements for oil well drilling), adhesive formulations and acoustic or thermal insulating applications.

The hollow microspheres may also be used to contain and/or store other materials. Typical containment applications include medical and medicinal applications (e.g. microcontainers for drugs), micro-containment for radioactive or toxic materials, and micro-containment for gases and liquids.

The hollow microspheres may also be used in to provide specific surface activities in various applications where surface reactions are used such as substrate applications. Surface activities may be further improved by subjecting the microspheres to secondary treatments, such as metal or ceramic coating, acid leaching etc. Typical substrate applications include ion exchange applications for removing contaminants from fluid, catalytic applications in which the surface of the microsphere is treated to serve as a catalyst in synthetic, conversion or decomposition reactions, filtration where contaminants are removed from gas or liquid streams, conductive fillers or RF shielding fillers for polymer composites, and medical imaging.

Exemplary embodiments of the disclosure include:

Embodiment 1

A method of forming hollow microspheres comprising dispensing a feed, heating the feed using conditions sufficient to convert at least a portion of the feed into hollow microspheres, wherein the dispensing is conducted using vibratory energy.

Embodiment 2

A method according to embodiment 1 wherein the vibratory energy is ultrasonic energy.

Embodiment 3

A method according to any of the preceding embodiments wherein the hollow microspheres have a substantially single cell structure.

Embodiment 4

A method according to any of the preceding embodiments wherein the dispensing system further comprises one of an ultrasonic horn and shaker.

Embodiment 5

A method according to embodiment 4 wherein the ultrasonic horn is further connected to a booster which is connected to a piezoelectric transducer.

Embodiment 6

A method according to any of the preceding embodiments wherein the dispensing system further comprises an elongated housing having a hollow inner tube vertically centered therein, and the feed is introduced into the hollow inner tube using a carrier gas.

Embodiment 7

A method according to claim any of the preceding embodiments wherein the heating is provided under vacuum.

Embodiment 8

A method according to embodiment 7 wherein the vacuum is maintained at equal to or less than 6,773 Pa (2 inches Hg) absolute.

Embodiment 9

A method according to embodiment 7 wherein the vacuum is maintained at equal to or less than 33,864 Pa (10 inches Hg) absolute.

Embodiment 10

A method according to any of the preceding embodiments wherein the feed is selected from at least one of glass, recycled glass, perlite, and combinations thereof.

Embodiment 11

A method according to any of the preceding embodiments wherein the feed comprises
 (a) between 50 wt % and 90 wt % of $SiO_2$;
 (b) between 2 wt % and 20 wt % of alkali metal oxides;
 (c) between 1 wt % and 30 wt % of $B_2O_3$;
 (d) between 0 wt % to 0.5 wt % of sulfur;
 (e) between 0 wt % and 25 wt % divalent metal oxides;
 (f) between 0 wt % and 10 wt % of tetravalent metal oxides other than $SiO_2$;
 (g) between 0 wt % and 20 wt % of trivalent metal oxides;
 (h) between 0 wt % and 10 wt % of oxides of pentavalent atoms; and
 (i) between 0 wt % and 5 wt % fluorine.

Embodiment 12

A method according to any of the preceding embodiments wherein the step of heating the feed using conditions sufficient to convert at least a portion of the feed into hollow microspheres comprises heating the feed to a temperature of greater than 1300° C.

Embodiment 13

Hollow microspheres made using a method comprising dispensing a feed using vibratory energy, and heating the feed using conditions sufficient to convert at least a portion of the feed into hollow microspheres.

Embodiment 14

Hollow microspheres according to embodiment 13 wherein the vibratory energy is ultrasonic energy.

Embodiment 15

Hollow microspheres according to embodiment 13 or 14 wherein the hollow microspheres have a substantially single cell structure.

Embodiment 16

Hollow microspheres according to embodiment 13, 14 or 15 wherein the heating is provided under vacuum.

Embodiment 17

Hollow microspheres according to embodiment 16 wherein the vacuum is maintained at equal to or less than 6,773 Pa (2 inches Hg) absolute.

Embodiment 18

Hollow microspheres according to embodiment 16 wherein the vacuum is maintained at equal to or less than 33,864 Pa (10 inches Hg) absolute.

Embodiment 19

Hollow microspheres according to embodiment 13, 14, 15, 16, 17 or 18 wherein the feed is selected from at least one of glass, recycled glass, perlite, and combinations thereof.

Embodiment 20

Hollow microspheres according to embodiment 13, 14, 15, 16, 17, 18 or 19 wherein the feed comprises
 (a) between 50 wt % and 90 wt % of $SiO_2$;
 (b) between 2 wt % and 20 wt % of alkali metal oxides;
 (c) between 1 wt % and 30 wt % of $B_2O_3$;
 (d) between 0 wt % to 0.5 wt % of sulfur;
 (e) between 0 wt % and 25 wt % divalent metal oxides;
 (f) between 0 wt % and 10 wt % of tetravalent metal oxides other than $SiO_2$;
 (g) between 0 wt % and 20 wt % of trivalent metal oxides;
 (h) between 0 wt % and 10 wt % of oxides of pentavalent atoms; and
 (i) between 0 wt % and 5 wt % fluorine.

Embodiment 21

Hollow microspheres according to embodiment 13, 14, 15, 16, 17, 18, 19 or 20 wherein the dispensing system further comprises an elongated housing having a hollow inner tube vertically centered therein, wherein the hollow inner tube has a top end and a bottom end, and further wherein an ultrasonic horn extends from the top of the elongated housing to just above the top end of the hollow inner tube.

Embodiment 22

Hollow microspheres according to embodiment 21 further comprising fluidizing feed in the elongated housing and introducing the feed into the hollow inner tube using a carrier gas.

Embodiment 23

An apparatus for forming hollow glass microspheres comprising:
 a dispensing system having a housing and an ultrasonic device; and
 a heating system;
wherein the heating conditions are sufficient to convert at least a portion of the feed into hollow microspheres, and the dispensing is conducted using ultrasonic energy.

Embodiment 24

An apparatus according to embodiment 23, wherein the heating system further comprises a vacuum system.

The following specific, but non-limiting, examples will serve to illustrate the invention. In these examples, all amounts are expressed in parts by weight unless specified otherwise.

Apparatus

A furnace model "Astro 1100-4080 MI" (commercialized by Thermal Technology Inc., California, USA) was used as the heating system in the following examples, except that the inner chamber (inplate) was modified by removing the upper and lower hearths to allow particles or feed to free fall through the heating system. Three cooling air blowers (commercialized by Master Appliances Corp., Wisconsin, USA, under the trade designation "Master Heat Gun") were fixed to the structure of the heating system by means of mechanical clamps: one cooling air blower was located in the top portion of the heating system near a feeding opening, and two cooling air blowers were located in the bottom portion of the heating system, blowing air at a collecting opening. A feeding opening located on the top portion of the heating system was modified by adding an O-ring seal to hold dispensing systems in place.

Test Methods

Average Particle Density Determination

A fully automated gas displacement pycnometer obtained under the trade designation "Accupyc 1330 Pycnometer" from Micromeritics, Norcross, Ga., was used to determine the density of microspheres according to ASTM D2840-69, "Average True Particle Density of Hollow Microspheres".

Particle Size Determination

Particle size distribution was determined using a particle size analyzer available under the trade designation "Coulter Counter LS-130" from Beckman Coulter, Fullerton, Calif.

EXAMPLES

Comparative Example A

Example 1 was prepared using a feed obtained as described in PCT Patent Publication No. WO2006/062566, incorporated herein by reference. The feed comprised 485 g of $SiO_2$ (obtained from US Silica, West Virginia, USA), 114 g of $Na_2O.2B_2O_3$, 90% smaller than 590 μm (obtained from US Borax, California, USA), 161 g of $CaCO_3$, 90% smaller than 44 μm (obtained from Imerys, Alabama, USA), 29 g of $Na_2CO_3$ (obtained from FMC Corp., Wyoming, USA), 3.49 g of $Na_2SO_4$, 60% smaller than 74 μm (obtained from Searles Valley Mineral, California, USA), and 10 g of $Na_4P_2O_7$, 90% smaller than 840 μm (obtained from Astaris, Missouri, USA). Total sulfur concentration of the glass feed was 0.12%.

The feed was milled in the fluidized bed jet mill (available under the trade designation "Alpine Model 100 APG" from Hosokawa Micron Powder Systems, Summit, N.J.) yielding a feed with average particle size of about 13 μm. The feed was dispensed into the heating system using the apparatus 10 depicted in FIG. 1 and described in the corresponding text, except that an ultrasonic device was not used. With the feed placed between the elongated housing 20 and the hollow inner tube 26, carrier gas was injected through the neck 34 at a flow rate of 6-8 cubic feet per hour (CFH) and vacuum of 101.591 Pa (−30 in Hg) absolute. The feed was suspended toward the constricted opening at the top end the hollow inner tube 26 and pulled toward the heating system 14 through the hollow tube 26 due to the vacuum pressure applied thereto. Process conditions and density of bubbles prepared according to Comparative Example A are shown in Table 1, below.

TABLE 1

Process conditions and density of Comparative Example A.

| Example | Temperature (° C.) | Flow (Cfh) | Vacuum (inHg) | Throughput (g/min) | Density (g/ml) |
|---|---|---|---|---|---|
| Comparative Example A | 1400 | 6-8 | −30 | 2.5 | 0.846 |

Temperature was measured using a handheld pyrometer (available under the trade designation "Mikron M90-31" from Mikron Infrared, California, USA).

Examples 1-4

Examples 1 through 4 were prepared as described in Comparative Example A, except that ultrasonic energy was used to disperse the feed prior to dispensing it into the heating system.

The feed 32 was dispensed into the heating system 14 using the apparatus 10 depicted in FIG. 1 and described in the corresponding text. An ultrasonic horn 29 attached to a 1.5 gain booster (commercially available from Dukane Corporation) was mounted on the dispenser 12, with the gap between the ultrasonic horn 29 and the hollow inner tube 26 being from about 0.3 to about 0.5 mm. With the feed 32 placed between the elongated housing 20 and the hollow inner tube 26, carrier gas was injected through the neck 34 at a flow rate of 6-8 cubic feet per hour (CFH) and vacuum according to Table 2, below. The feed was suspended toward the constricted opening at the top end the hollow inner tube 26 and pulled toward the heating system 14 through the hollow tube 26 due to the vacuum pressure applied thereto.

Temperature was measured using the handheld pyrometer.

Process conditions and test results are shown in Table 2, below.

TABLE 2

Process conditions and density of Examples 1-4.

| Example | Temperature (° C.) | Flow (Cfh) | Vacuum (inHg) | Throughput (g/min) | Density (g/ml) |
|---|---|---|---|---|---|
| Example 1 | 1400 | 6-8 | −30 | 3.1 | 0.537 |
| Example 2 | 1400 | 6-8 | −29 | 2.13 | 0.569 |
| Example 3 | 1450 | 6-8 | −29 | 5.85 | 0.482 |
| Example 4 | 1450 | 8 | −29 | 7.57 | 0.555 |

Figure 2:
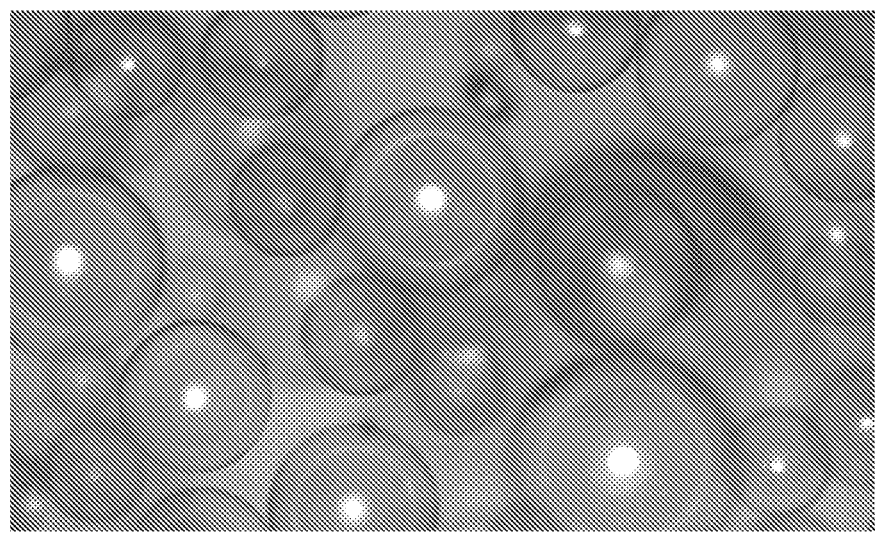
FIG. 2 is an optical image of the glass hollow microspheres prepared according to Example 1.

FIG. 2 is the optical image of the glass hollow microspheres prepared as described in Example 1 taken with a microscope model "DM LM" connected to a digital camera model HRD-060HMT, available from Leica Mycrosystems of Illinois, USA. The hollow microspheres shown in FIG. 2 have a substantially single cell structure Various modifications and alterations of this invention will become apparent to those skilled in the art without departing from the scope and spirit of this invention.

What is claimed is:

1. A method of forming hollow microspheres comprising dispensing a feed with a dispenser, heating the feed using conditions sufficient to convert at least a portion of the feed into hollow microspheres, wherein the dispensing is conducted using vibratory energy, wherein the feed comprises
    (a) between 50 wt % and 90 wt % of $SiO_2$;
    (b) between 2 wt % and 20 wt % of alkali metal oxides;
    (c) between 1 wt % and 30 wt % of $B_2O_3$;
    (d) between 0 wt % to 0.5 wt % of sulfur;
    (e) between 0 wt % and 25 wt % divalent metal oxides;
    (f) between 0 wt % and 10 wt % of tetravalent metal oxides other than $SiO_2$;
    (g) between 0 wt % and 20 wt % of trivalent metal oxides;
    (h) between 0 wt % and 10 wt % of oxides of pentavalent atoms; and
    (i) between 0 wt % and 5 wt % fluorine.

2. A method according to claim 1 wherein the vibratory energy is ultrasonic energy.

3. A method according to claim 1 wherein the hollow microspheres have a substantially single cell structure.

4. A method according to claim 1 wherein the dispensing is carried out by a dispenser selected from the group consisting of an ultrasonic horn and shaker.

5. A method according to claim 4 wherein the ultrasonic horn is further connected to a booster which is connected to a piezoelectric transducer.

6. A method according to claim 1 wherein the dispenser further comprises an elongated housing having a hollow inner tube vertically centered therein, and the feed is introduced into the hollow inner tube using a carrier gas.

7. A method according to claim 1 wherein the heating is provided under vacuum.

8. A method according to claim 7 wherein the vacuum is maintained at equal to or less than 6,773 Pa (2 inches Hg) absolute.

9. A method according to claim 1 wherein the feed is selected from at least one of glass, recycled glass, perlite, and combinations thereof.

10. A method according to claim 1 wherein the step of heating the feed using conditions sufficient to convert at least a portion of the feed into hollow microspheres comprises heating the feed to a temperature of greater than 1300° C.

* * * * *